United States Patent
Koch et al.

(10) Patent No.: US 8,487,944 B2
(45) Date of Patent: Jul. 16, 2013

(54) SYSTEM AND METHOD FOR PROCESSING OF IMAGE DATA IN THE MEDICAL FIELD

(75) Inventors: Manfred Koch, Röttenbach (DE); Stefan Lautenschläger, Hausen (DE)

(73) Assignee: Siemens Aktiengesellschaft, München (DE)

( * ) Notice: Subject to any disclaimer, the term of this patent is extended or adjusted under 35 U.S.C. 154(b) by 932 days.

(21) Appl. No.: 12/606,269

(22) Filed: Oct. 27, 2009

(65) Prior Publication Data
US 2010/0103804 A1   Apr. 29, 2010

(30) Foreign Application Priority Data
Oct. 28, 2008  (DE) .................. 10 2008 053 470

(51) Int. Cl.
*G06F 15/16* (2006.01)
*G06F 15/80* (2006.01)

(52) U.S. Cl.
USPC ............ 345/505; 345/502; 345/503; 345/504

(58) Field of Classification Search
USPC .................................. 345/501–505
See application file for complete search history.

(56) References Cited

U.S. PATENT DOCUMENTS

| | | | |
|---|---|---|---|
| 7,133,041 B2 * | 11/2006 | Kaufman et al. | 345/419 |
| 2005/0231504 A1 * | 10/2005 | Heng et al. | 345/420 |
| 2009/0201303 A1 * | 8/2009 | Westerhoff et al. | 345/520 |

FOREIGN PATENT DOCUMENTS

| | | |
|---|---|---|
| DE | 102005019840 A1 | 11/2006 |
| EP | 1316922 A1 | 6/2003 |
| WO | WO 0013146 A1 | 3/2000 |
| WO | WO 2008051231 A1 | 5/2008 |

* cited by examiner

*Primary Examiner* — Hau Nguyen

(57) ABSTRACT

An image processing system in the medical field is provided. The system for processing image data includes at lest two graphics processors, at least one renderer module for rendering image data and at least one reconstruction module for volume reconstruction. In a first operating mode of the system in which at least one reconstruction module is inactive, the instructions of at least one renderer module is able to be executed by at least two of the graphics processors. In a second operating mode of the system in which at least one reconstruction module is active, the instructions of at least one renderer module and the instructions of at least one reconstruction module is able to be executed separately on different graphics processors of the said graphics processors. During operation in one of the two operating modes, a switch can be made to the other operating mode in each case.

8 Claims, 2 Drawing Sheets

SYSTEM AND METHOD FOR PROCESSING OF IMAGE DATA IN THE MEDICAL FIELD

CROSS REFERENCE TO RELATED APPLICATIONS

This application claims priority of German application No. 10 2008 053 470.6 filed Oct. 28, 2008, which is incorporated by reference herein in its entirety.

FIELD OF THE INVENTION

The invention relates to an image processing system or method for image processing in the medical field.

BACKGROUND OF THE INVENTION

If image processing is to be undertaken for recorded medical images, for example for x-ray images, at least part of this process is software-based. The algorithms necessary for image processing are thus, at least in part, implemented in software, with the software being executed on a so-called high-end medical computer system, also known as a workstation.

On the medical workstations (e.g. in the cardiological and angiographic environment) two processes which demand a high level of resources and computing power are preferably carried out on the image data originating from the recorded images:
1. nD rendering (multidimensional rendering or image synthesis)
2. Reconstruction of volume data Since rendering is a very memory-intensive operation, it is primarily a GPU-based process (e.g. on a graphics card). Ever faster GPU processors and larger storage capacities are being provided on new-generation graphics cards.

Reconstruction involves an operation which is to be carried out very quickly and contemporaneously, since the computation operations of the reconstruction are to be carried out where possible directly after or during the acquisition of the image data needed. A delay between acquisition and beginning of reconstruction is inconvenient during an operative intervention.

Whereas a graphics card which has a very high storage capacity (to avoid what is known as swapping between GPU and main memory)—as described above—is used for the rendering, a further card compatible with the graphics card is used for reconstruction, which is designed to fulfill the intensive computational requirements of the reconstruction. For example a so-called PCI (Peripheral Component Interconnect) card can be used for this purpose.

FIG. 1 shows an example of such an image processing system Sy. It features a central processing unit CPU, which is connected to a storage unit St, to an input interface I-IF for a data input I and to an output interface O-IF for a data output O as well as to a graphics card GC, on which one or more GPU processors can be arranged and to a PCI expansion card PCI.

Accordingly the rendering is carried out in the example on the graphics card GC and the reconstruction on the expansion card PCI.

This method of operation is uneconomical, since costs for a high-quality graphics card with a high storage capacity as well for an expansion card suitable for the reconstruction must be incurred.

A further disadvantage lies in the fact that with PCI expansion cards a part implementation of the algorithms is often also necessary in hardware or firmware (for example with the algorithms for many C-arm x-ray systems). In this case the number of PCI expansion slots in the workstations for image processing, which usually involve standard PCs, is restricted.

Because of the serial data flow in image processing, the cable already defines the data flow, but also whether the algorithms are to be implemented in hardware or software. This means that the sequence in which the algorithms will be processed is largely defined. The structure of the image processing is thus rigidly predetermined. The consequence of this is that the PCI expansion card provides practically no interfaces for future computer generations, which results in further costs for a comparable expansion card when the workstation is replaced.

SUMMARY OF THE INVENTION

The invention is thus based on the object of specifying an image processing system that is improved in this regard.

This object is achieved by the features specified in the independent claims. Advantageous embodiments of the invention are identified in the dependent claims.

One aspect of the invention is a system to process image data in the medical field, comprising:
- at least two graphics processors,
- at least one renderer module for rendering or synthesis of image data and
- at least one reconstruction module for volume data reconstruction. In this case, in a first operating mode of the system in which at least one reconstruction module is inactive, the instructions of at least one renderer module are able to be executed by at least two of the graphics processors and in a second operating mode of the system, in which at least one reconstruction module is active, the instructions of at least one renderer module and the instructions of the at least one reconstruction module are able to be executed separately on different graphics processors of the said graphics processors. During operation of the system a switch can be made in one of the two operating modes to the other operating mode respectively.

In this case the at least two graphics processors can be arranged on a graphics card used in the system or separately on two or more graphics cards used in the system.

What is known as the load balancing method is preferably usable in the first operating mode, and this mode will be explained in greater detail below in an exemplary embodiment.

The data volume of the image data is able to be temporarily reduced in the second operating mode. More details are given in the exemplary embodiment below. The advantage of this is that in this operating mode sufficient resources can be made available for the reconstruction.

A further aspect of the invention is a graphics card for use in the system given above, comprising at least one graphics processor which features an interface to at least one further graphics processor, with the at least one graphics processor able to be operated in the first and/or second operating mode. In this case a so-called multi-GPU technology can be used in which the so-called SLI (Scalable Link Interface) bridge described in greater detail in the subsequent exemplary embodiment will be used.

Inventively the principle of the SLI (Scalable Link Interface) is used or expanded for optimum load balancing (i.e. distribution of work) of rendering and reconstruction.

A further aspect of the invention is a method for processing image data in the medical field, with:

At least two graphics processors communicating with each other,

At least one renderer module for synthesis or rendering of image data and

At least one reconstruction module for volume reconstruction being provided. In this case in a first processing mode, in which at least one reconstruction module is inactive, the instructions of at least one renderer module are able to be executed by at least two of the graphics processors and in a second method mode, in which at least one reconstruction module is active, the instructions of at least one renderer module and the instructions of the at least one reconstruction module are able to be executed separately on different graphics processors of the said graphics processors. A switch can be made in one of the two method modes to the other method mode respectively The above-mentioned load balancing method is preferably applied in the first method mode.

The advantages of the invention are as follows:

The present invention represents a cost-effective solution to the problems presented above. One of the two dual-GPU graphics cards, which comprises a so-called SLI (Scalable Link Interface) bridge, is currently lower in price than the said PCI card by a factor of 10. In addition to this cost saving it is likely that SLI-capable graphics cards will in future be faster, offer more storage space and above all be better since their development is primarily dictated by the computer games industry.

Current SLI-capable graphics cards have a storage capacity of one Gigabyte per card. That means that in the standard case (rendering only, no reconstruction) a total storage capacity of two Gigabytes is available. This corresponds to an increase of 33% compared to the PCI card currently used. This makes it possible to load more volumes in higher resolution in computer applications.

The necessary requirements in relation to a minimized time delay can be achieved by the high speed and bandwidth of SLI cards (and the bridge between them).

BRIEF DESCRIPTION OF THE DRAWINGS

Described in detail below is an exemplary embodiment of the invention which refers to a drawing.

The figures of the drawing are as follows.

DETAILED DESCRIPTION OF THE INVENTION

Figure 1:
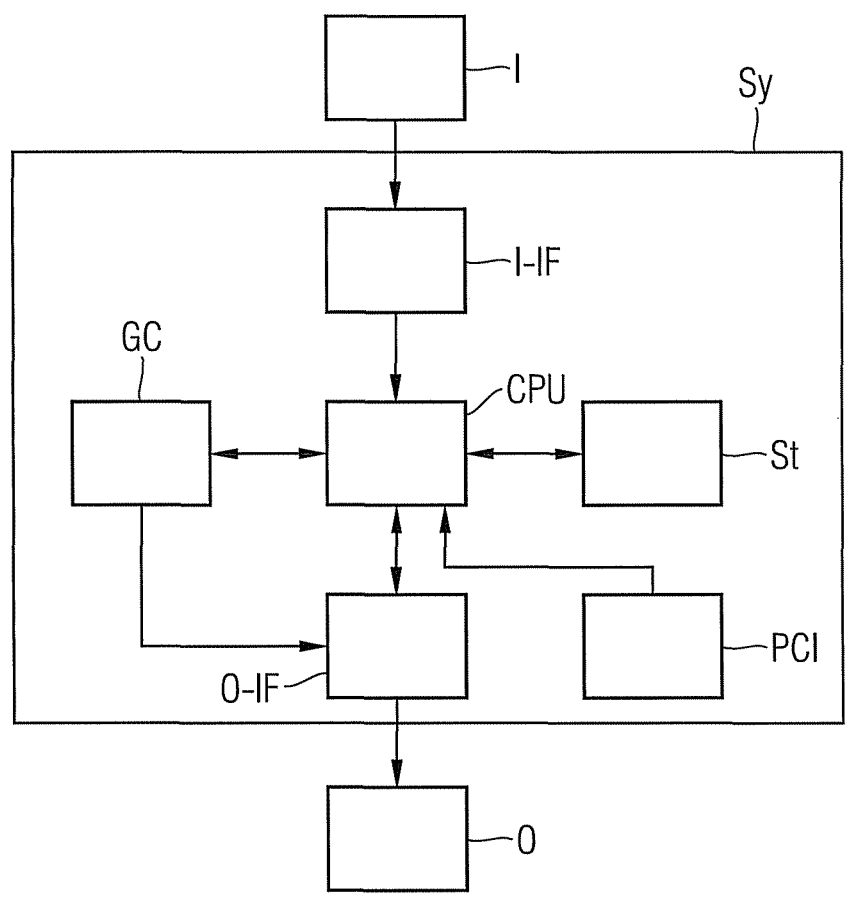
FIG. 1 an example of an image processing system of the type given at the start and FIG. 2 an example of an image processing system according to the invention.
Figure 2:
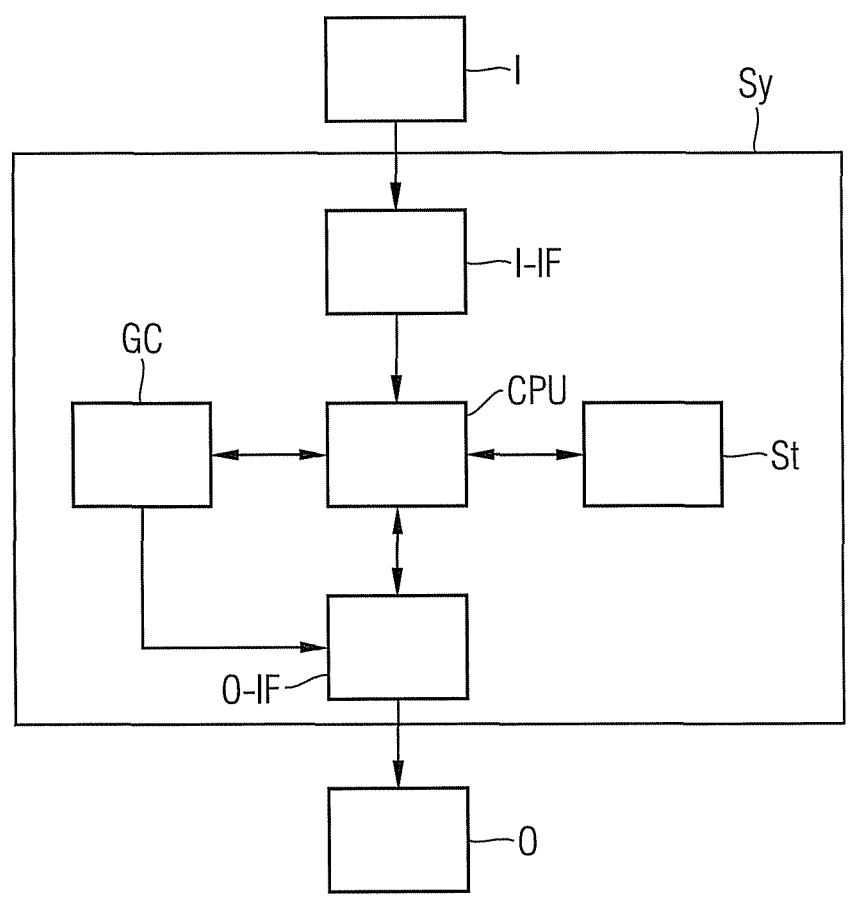

FIG. 2 shows an example of an inventive image processing system. In addition to the comparable components CPU, St, I-IF, O-IF and GC used in FIG. 1, an expansion card PCI connected to the CPU is available, preferably a so-called PCI card.

Inventively the rigid separation between rendering and reconstruction will be dispensed with and the two operations executed on two networked graphics cards.

This technology is based on SLI (Scalable Link Interface). SLI is a multi-GPU technology which makes it possible to connect together two or more graphics chips. The intention behind the development of this technology is primarily characterized by the aim of achieving an increase in power during rendering of computer games.

This is achieved by the rendering work of an image being distributed to the two graphics cards for example. The procedure in this case is that this distribution occurs through a load balancing such that the two systems do the same work. With a typical landscape image with low contrast in the background (e.g. sky) and high computing effort for objects in the foreground (e.g. flowers, houses or structures . . . ) the image is not divided horizontally but vertically in order to achieve an equal distribution of the workload. This then results in a high speed.

This principle of load balancing is transferred by the so-called hybrid SLI and SLI bridges to the distribution of resources between 1. Rendering and
2. Reconstruction.

In standard operation (rendering only, no reconstruction) the two cards should be operated in the so-called "Alternate Frame Rendering" mode. I.e. the rendering work is distributed between the two cards. This enables the two cards to be used entirely for the rendering. The result of this is that the speed increases and the size of the graphics card memory is approximately doubled. This in turn results in more volume or a higher resolution of the volumes being able to be rendered before the system "relocates" data (so-called swapping).

In the case of reconstruction a separation of rendering and reconstruction is practiced. This means that one of the two graphics cards continues to be used for rendering. The second graphics card takes over the reconstruction. Inventively it is proposed that the resolution of the rendered volumes be reduced over the short term (e.g. from 13 bits to 8 bits). This is not a disadvantage in practice since the time demanded for reconstruction is small. The fact that the bandwidth of the memory is very high means that any time delay possibly arising for erasing the second graphics card (and synchronizing the first graphics card) becomes minimal. This structure is thus able to fulfill the high time demands at the start of the reconstruction.

The invention claimed is:

1. A system for processing an image data in a medical field, comprising:
   a first graphics processor;
   a second graphics processor;
   a renderer module for rendering the image data;
   a reconstruction module for a volume reconstruction of the image data;
   a first operating mode that entirely executes rendering the image data distributed between the first graphics processor and the second graphics processor; and
   a second operating mode that continuously executes rendering the image data on the first graphics processor and executes the volume reconstruction separately on the second graphics processor,
   wherein the first operating mode and the second operating mode are configured to be switched between each other.

2. The system as claimed in claim 1, wherein the first graphics processor and the second graphics processor are arranged on a graphics card of the system.

3. The system as claimed in claim 1, wherein the first graphics processor and the second graphics processor are arranged separately on two or more graphics cards of the system.

4. The system as claimed in claim 1, wherein the first operating mode comprises a load balancing volume method.

5. The system as claimed in claim 1, wherein a data volume of the image data is temporarily reduced in the second operating mode.

6. A graphics card used in a system for processing an image data in a medical field, comprising:
- a first graphics processor;
- a second graphics processor; and
- an interface for connecting the first graphics processor to the second graphics processor,
- wherein the interface is configured to operate the system in a first operating mode that entirely executes rendering the image data distributed between the first graphics processor and the second graphics processor, and to operate the system in a second operating mode that continuously executes rendering the image data on the first graphics processor and executes a volume reconstruction separately on the second graphics processor, and
- wherein the first operating mode and the second operating mode are configured to be switched between each other.

7. A method for processing an image data in a medical field, comprising:
- communicating between a first graphics processor and a second graphics processor;
- providing a renderer module for rendering the image data;
- providing a reconstruction module for reconstructing the image data;
- entirely rendering the image data distributed between the first graphics processor and the second graphics processor in a first operating mode;
- continuously rendering the image data on the first graphics processor and executing the volume reconstruction separately on the second graphics processor in a second operating mode; and
- switching between the first operating mode and the second operating mode.

8. The method as claimed in claim 7, wherein the first operating mode is executed by a load balancing method.

* * * * *